C. E. P. GOURDOU.
MONOPLANE WITH SUBSIDIARY PLANES.
APPLICATION FILED SEPT. 11, 1918.
1,305,534.
Patented June 3, 1919.
6 SHEETS—SHEET 1.
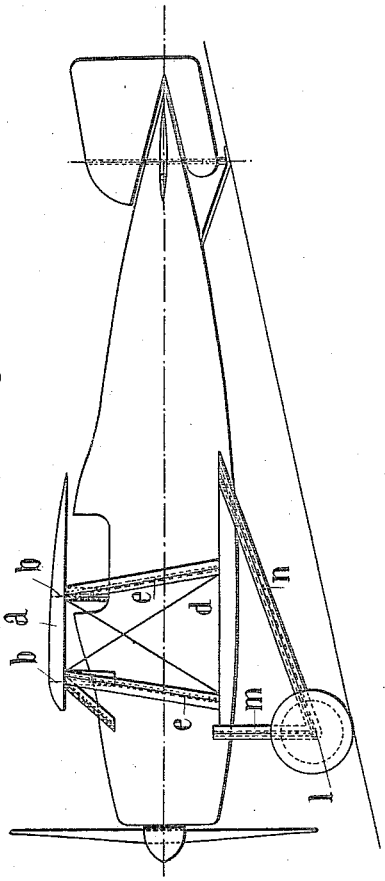
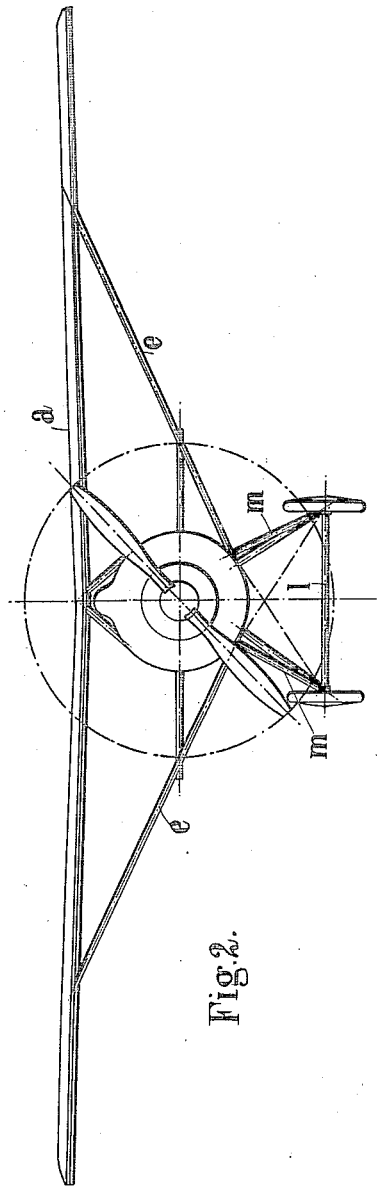
INVENTOR
Charles E. P. Gourdou
BY
ATTORNEY.

C. E. P. GOURDOU.
MONOPLANE WITH SUBSIDIARY PLANES.
APPLICATION FILED SEPT. 11, 1918.

1,305,534.

Patented June 3, 1919.
6 SHEETS—SHEET 2.

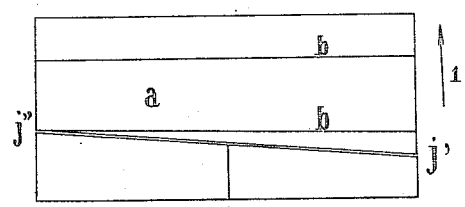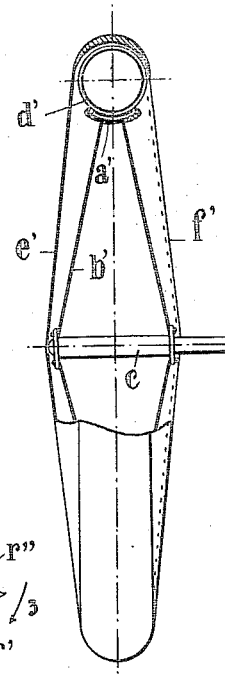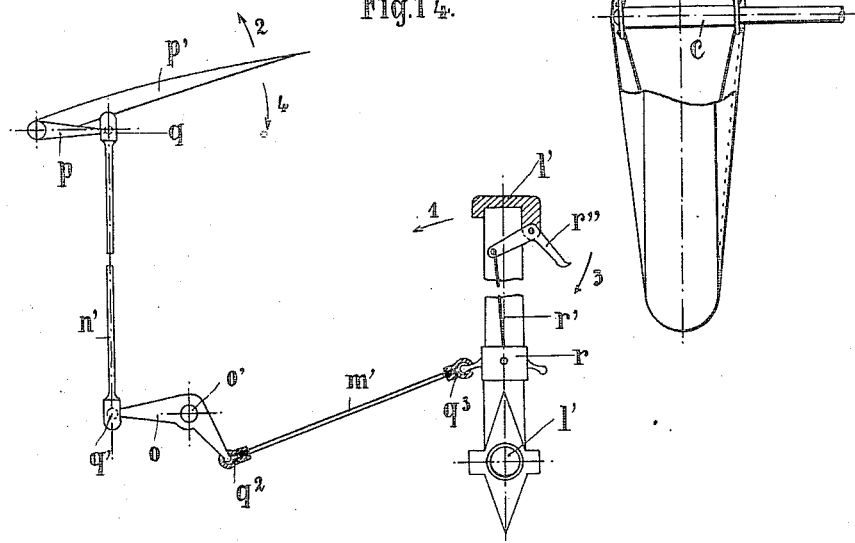

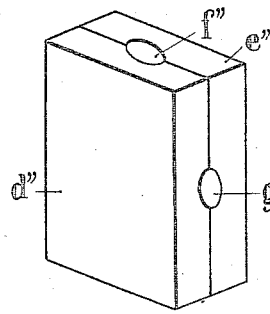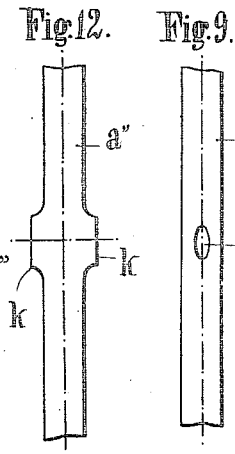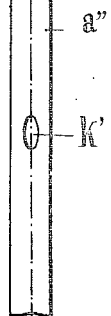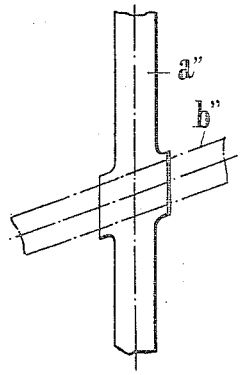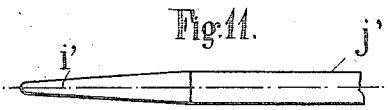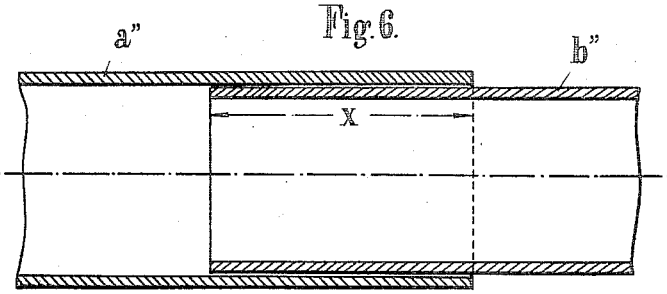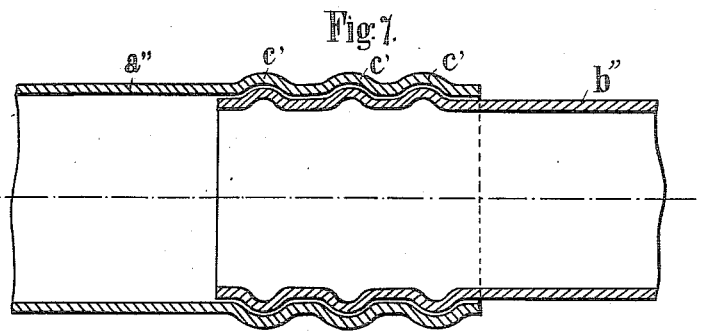

C. E. P. GOURDOU.
MONOPLANE WITH SUBSIDIARY PLANES.
APPLICATION FILED SEPT. 11, 1918.

1,305,534.

Patented June 3, 1919.
6 SHEETS—SHEET 5.

INVENTOR
Charles E. P. Gourdou
BY
ATTORNEY

UNITED STATES PATENT OFFICE.

CHARLES EDOUARD PIERRE GOURDOU, OF ST.-MANDÉ, FRANCE, ASSIGNOR TO HIMSELF AND JEAN ADOLPHE LESEURRE, OF ST.-MANDÉ, FRANCE.

MONOPLANE WITH SUBSIDIARY PLANES.

1,305,534.　　　　　Specification of Letters Patent.　　Patented June 3, 1919.

Application filed September 11, 1918. Serial No. 253,626.

*To all whom it may concern:*

Be it known that I, CHARLES EDOUARD PIERRE GOURDOU, citizen of the Republic of France, and resident of St.-Mandé, France, (post-office address 8 Avenue de la Courelle) have invented a new and useful Monoplane with Subsidiary Planes, which improvements are fully set forth in the following specification.

The present invention relates to a monoplane with subsidiary planes, the characteristic arrangements of which have been devised with a view to reducing to a minimum the resistance to the forward motion of the machine.

The aeroplane is shown by way of example in the accompanying drawing.

Figure 1 is a side view of the machine.

Fig. 2 is a front view of the machine.

Fig. 5 is a front elevation, partly in section, of one of the landing wheels.

Figs. 6, 7, 8, 9, 10, 11 and 12 relate to the assembling of the various tubes constituting the framework of the aeroplane.

Fig. 13 indicates the point of support of the control of the warping of the wing.

Fig. 14 relates to the control enabling the subsidiary planes to be acted upon in such a way that they incline either both in the same direction or in opposite directions to one another at the pilot's option.

Figure 15:
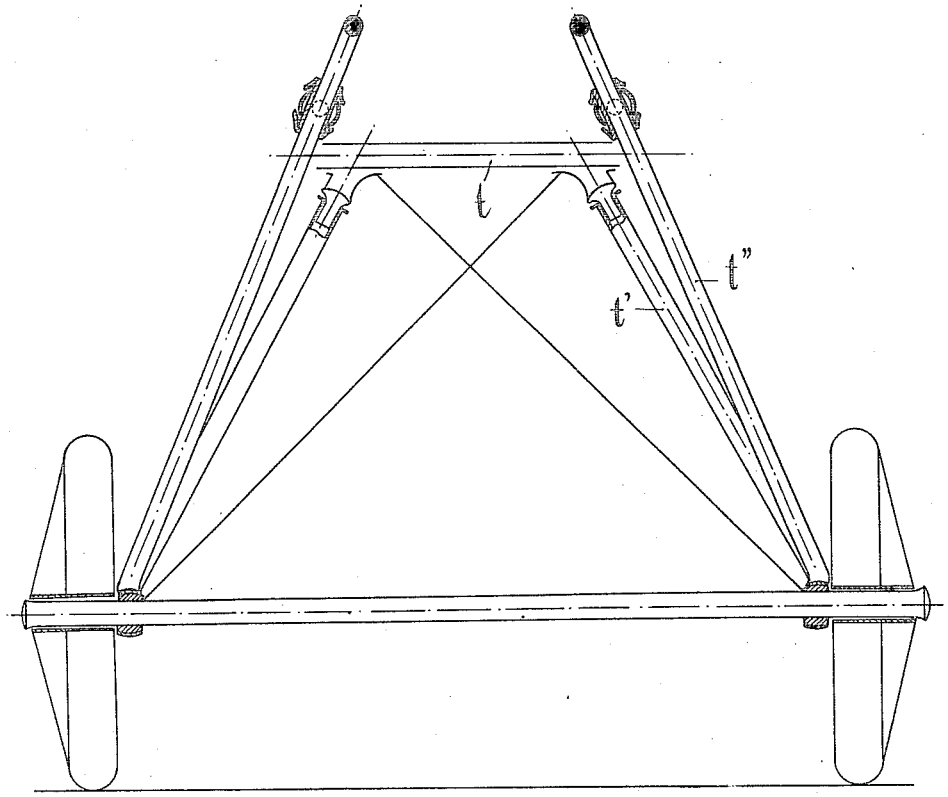
Figure 16:
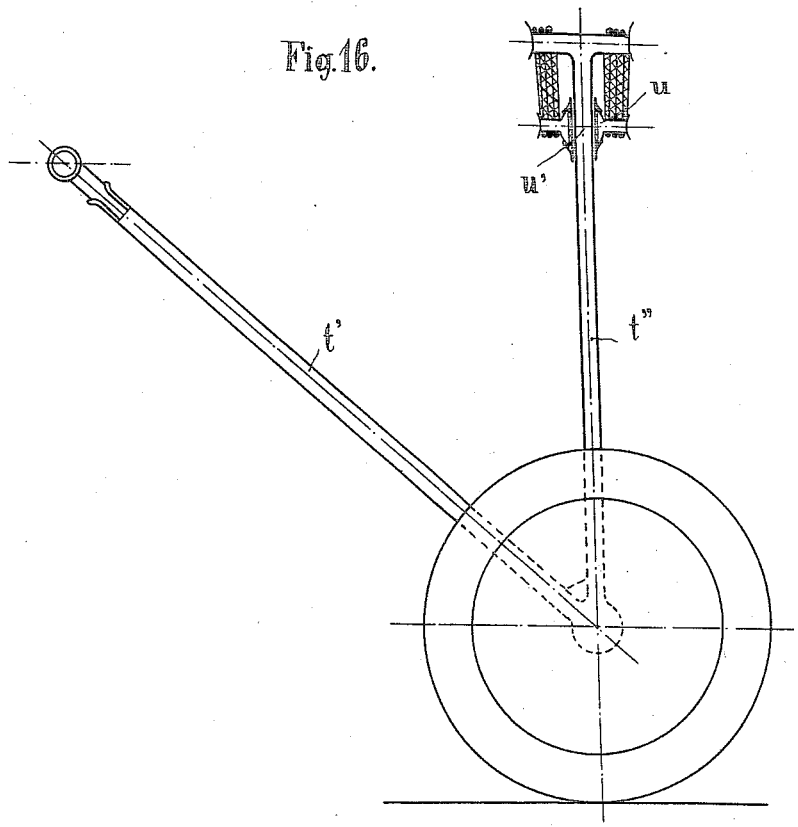

Figs. 15 and 16 relate to the carriage or support of the landing wheels.

Figure 17:
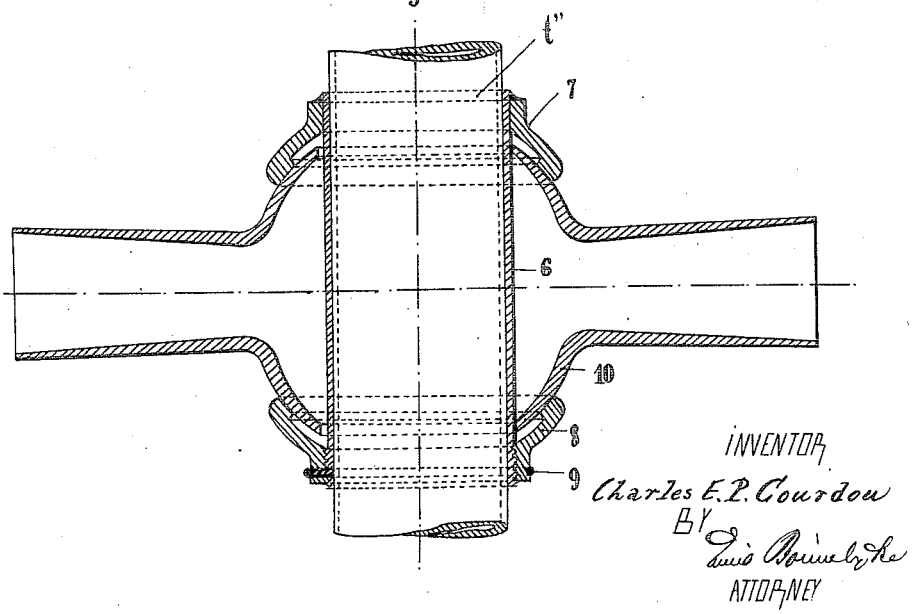

Fig. 17 shows, in detail one of the ball-and-socket joints employed.

Figure 18:
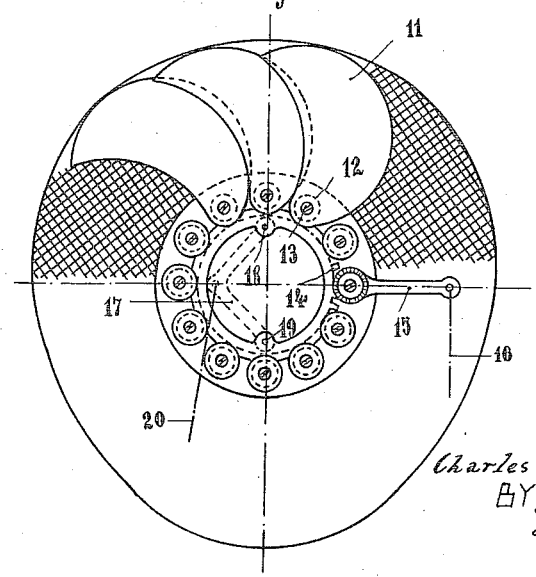

Fig. 18 is a front view of the iris diaphragm that conceals the radiator.

The frame of the main plane $a$ comprises essentially two longitudinal bearers $b$ embedded on the fuselage and supported at a single part on both sides of the fuselage by tapered tubular stays $e$.

Each stay $e$ consists essentially of a metal tube $f$, (Fig. 4) surrounded by a tapered wooden sheath not shown. The tapered envelop may be fixed on to the metal tube by any suitable means.

The following are the devices for adjusting and attaching the tubular stays:—

Figure 3:
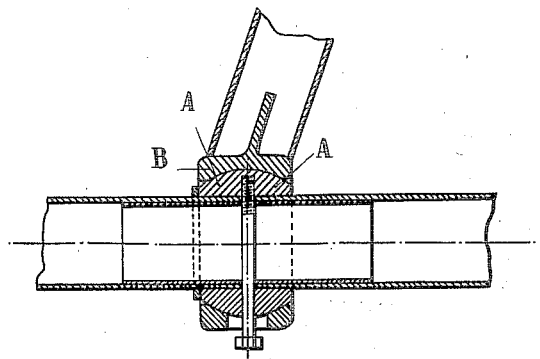
Figs. 3 and 4 are detail views on a larger scale.
Figure 4:
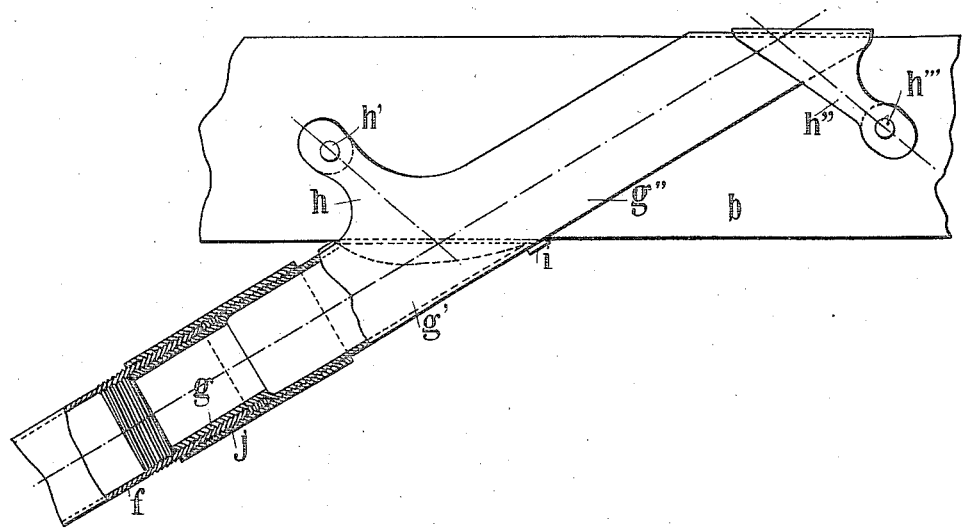

The metal tube $f$ terminates at the top (Fig. 4) in a part comprising two screw threads, one internal and the other external. Into the internal screw thread is screwed a tube $g$, which widens out at $g'$ so as to form a fork with two prongs $g''$, between which is embraced the wing arm or longitudinal bearer $b$. Each arm of the fork is provided with two lugs, one of which, $h$ is fixed to the longitudinal bearer by means of a bolt $h'$, while the other which is virtually integral with the end part of the prong and is bent over and down on the other side of the longitudinal bearer $b$. In Fig. 4 the lug $h''$ of the prong $g''$ is seen, located behind the longitudinal bearer. This lug $h''$, like the lug $h$, is fixed by means of a bolt. In the drawing, $h'''$ designates this second bolt. A recess $i$, formed in the longitudinal bearer $b$, and into which there passes the fork $g'$ rests, and serves to secure the fork in position. By reason of the method of fixing hereinbefore described, and the bending over and down of the second lug of each fork to the opposite side of the longitudinal bearer, the shearing of the bolts $h'$ and $h'''$ under the tensile stresses exerted by the stays is obviated.

The adjustment of the stay is obtained by screwing the tube $g$ more or less into the tube $f$. When adjustment is obtained a sleeve $j$ is screwed up, covering the extremities of the tubes $g$ and $f$, the sleeve being furthermore secured to the tube $g$ by means of a pin. Unscrewing is thus rendered impossible, especially as the pitch of the screw thread on $g$, which screws on to the upper end of the tube $f$, is different from that of the outer sleeve $j$. It should be observed that in this mounting device welding is entirely obviated. The stays are reinforced by two stretched cords $b, d$.

The ratio between the total length of the wing and the part of the wing comprised between the two stays may vary, but will preferably be in the neighborhood of $\sqrt{2}$.

With a view to obviating eddies of air around the landing wheels, each wheel may be constructed, as indicated in Fig. 5, of a rim $a'$, supported, by means of spokes $b'$ by the axle $c$.

On the rim $a'$ an inner tube $d'$ is placed, kept in position in the usual way by means of rubbered canvas covers without treads, and over the whole is placed an outer cover or envelop $e'$ of canvas, leather or other suitable material, completely surrounding the wheel and laced at $f'$, after being placed in position, from the outside, the object of the lacing being to secure the position of the envelop around the wheel.

The tread consists of an india rubber band which is virtually integral with the envelop $e'$ and which, when this envelop is placed in position lodges against the inner tube $d'$.

In order to dismount the wheel all that is necessary is to undo the lacing at $f'$ and remove the outer cover which enables access to be obtained to the inner tube.

As indicated in Fig. 6, if occasion arises to unite two tubes $a''$, $b''$ end to end, they are inserted one in the other for a certain length $x$. That being done, by inserting through one end of one of the tubes a circular mandrel and forcing back the metal around the said mandrel, annular ridges $c'$ are produced (Fig. 7) which may project equally, or which may project unequally, decreasing from one extremity to the other. In this way an assemblage is obtained which is very strong and which can be executed very quickly, dispensing with all screw threads and other devices hitherto utilized. The annular ridges instead of being produced outwardly, may likewise be produced inwardly.

For the purpose of uniting two tubes that cross one another, the following procedure is adopted:—

A box is prepared in two parts $d''$, $e''$ (Fig. 8) in which, when the two parts are united to one another, passages $f''$, $g'''$ are formed, cutting one another at the angle at which the tubes to be united are to cross one another. On one of the tubes $a''$ and at the point where the other tube, $b''$, is to cross, an elliptical opening $k'$ is produced by cutting away the metal. The tube $a''$ is then placed in the passage $f''$ of the box $d''$, $e''$, and this tube is pressed until the hole $k'$ comes opposite to the passage $g'''$. When this has been effected, the punch shown in Fig. 11, that is to say, a punch which is conical in the part $i'$ and cylindrical in the part $j'$, is inserted in the hole $g'''$. When the punch has traversed the tube $a''$ until the cylindrical part $j'$ has enlarged the hole $k'$ it is withdrawn and it is found that on the tube $a''$ two seatings or bearing surfaces $k$ (Fig. 12) have been formed, comprising external projections lodged in suitably formed cavities in the box $d''$, $e''$. Through the opening $g''''$ is then inserted the tube $b''$, which passes through the tube $a''$ from one side to the other. The two parts $d''$, $e''$ of the box are separated, and the assemblage of the two tubes $a''$, $b''$ is consolidated by inserting a pin at the point of crossing.

The crossing, instead of being at right angles, as indicated by the formation of the bearing surfaces $k$ in Fig. 12, may be made at any angle (Fig. 10).

As indiacted by Fig. 13, which shows a diagrammatic plan of one of the wings $a$ of the aeroplane, the control of the warping takes its point of support at $j''$, on the side of the keelson on the back longitudinal bearer $b$ of the wing, the movement of the wing taking place in the direction of the arrow 1.

Fig. 14 shows the control which makes it possible to act on the subsidiary planes in such a way as to incline them both in the same direction or in opposite directions to one another at the pilot's option. The control lever or "stick" is movable in all directions about the lower point $l'$. At $l'$ are arranged two inverted-T axes. $m$ and $n'$ are two connecting rods with ball-and-socket joints, comprising between them a bell-crank lever $o$ capable of oscillating about $o'$. $p$ is the crank of the subsidiary plane $p'$. $q$, $q'$, $q^2$, $q^3$ are ball-and-socket joints. When the control lever or "stick" is inclined in the direction of the arrow 1 the plane rises in the direction of the arrow 2. In this movement of the control lever the other plane sinks at the same time in the direction of the arrow 4. In this way, by suitable inclinations of the control lever the subsidiary planes may be moved in opposite directions.

The movements of the subsidiary planes in the same direction are obtained in the following manner: The ball-and-socket joints $q^3$ are carried by a ring $r$, which can slide along the tube $l'$, $l'$ of the broom handle. The travel of this ring may be effected by any means, and, as will be realized, the displacement of the ring $r$ along the control lever will produce the simultaneous inclination or elevation of the two subsidiary wings, according as the ring rises or descends along the broom handle. For the purpose of displacing the ring the following device may be indicated by way of example; the ring is connected by means of a link $r'$ to a grip lever $r''$. When the pilot presses the handle in the direction of the arrow 3 the subsidiary wing descends in the direction of the arrow 4, which augments the lifting power of the wing as the resistance of the air increases. The lever $r''$ may be locked if necessary.

Figs. 15 and 16 relate to a landing carriage. Each wheel describes an arc of a circle having its center located on the axis $t$. The back tube rotates about its axis $t'$. The front tube $t''$ slides in the ball-and-socket guide $u$ having for its fixed center the center $u'$.

Fig. 17 shows, with details, one of the spherical bearings employed, the one for example that is utilized on one of the front tubes of the frame. The front tube $t''$ passes through a guide 6 which is welded to a spherical steel socket 7. On to the slide 6 is screwed a second spherical socket 8. After being screwed up this cup is provided with a securing device made of piano wire. The ball strictly so called, 10, is retained in position between the two spherical sockets, and is formed of two welded or pressed flanged plates.

Fig. 18 is a front view of the diaphragm that conceals the radiator. It consists essentially of blades 11, made of sheet steel, riveted to the pinions 12. These pinions 12, which can rotate about axes 13 fixed to the radiator, gear with a toothed rim 14 to which can be given a rotary movement about its own axis by any suitable means. By rotating the rim 14, the rotation of the pinions 12 about their own axes is produced, and thereby the blades 11 are opened or closed according to the direction of rotation of the rim 14.

Among the numerous devices that may be utilized for the purpose of producing rotation of the rim 14, the accompanying drawing (Fig. 18) shows two. One of them consists of a lever 15 virtually integral with one of the pinions 12, upon which force may be exerted by means of a cable 16. The other consists of a fork 17 which is fixed to the rim at 18 and 19 and upon which force may be exerted by means of a cable 20.

Claims:

1. A monoplane with subsidiary wing, comprising tubular stays starting at both ends from the fuselage for the purpose of sustaining the wing at such a point that the bending moments on the longitudinal bearers may be equal on all the supports; a device for adjusting the stays uniting the wing to the fuselage; a landing carriage with its axle supported by four rotatable sliding tubes; wheels with an outer cover completely surrounding each of them and a means for fixing the outer covers; a framework with tubes united end to end by means of annular ridges, and tubes passing through one another with seating surfaces on one of them; spherical-seated bearings on the tubes of the chassis; a diaphragm shutter concealing the radiator; a simultaneous and individual control of the subsidiary planes; and the supporting of the warping control on the back longitudinal bearer of the wing.

2. A monoplane with subsidiary wing comprising tubular stays with central metal tube and a wooden sheath; stays in two parts screwed into one another for adjustment and a sleeve with stop pin on the parts that screw together; a landing carriage with its axle supported by four rotary sliding tubes; wheels on the landing carriage with an outer cover completely surrounding each of them, a lacing device for the purpose of securing the edges of the outer cover, a framework with tubes connected end to end by means of annular ridges; and tubes crossing one another with seating or bearing surfaces on one of them; ball-and-socket joints formed of two flanges welded plates, held between two spherical cups or sockets; a diaphragm with movable blades in front of the radiator; a control lever or "stick" movable into all positions; connections with the subsidiary wings by means of crank shafts and a ring sliding along the control; and a support for the warping control on the back longitudinal bearer of the wing.

In testimony whereof I have signed this specification in the presence of two subscribing witnesses.

CHARLES EDOUARD PIERRE GOURDOU.

Witnesses:
GEORGES LOISEL,
JOHN F. SIMONS.